United States Patent
Lehmann et al.

(10) Patent No.: US 6,883,487 B2
(45) Date of Patent: Apr. 26, 2005

(54) TORSIONAL VIBRATION DAMPING APPARATUS

(75) Inventors: Steffen Lehmann, Ettlingen (DE); Christian Fechler, Karlsruhe (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/737,028

(22) Filed: Dec. 16, 2003

(65) Prior Publication Data

US 2004/0127295 A1 Jul. 1, 2004

(30) Foreign Application Priority Data

Dec. 16, 2002 (DE) .......................................... 102 58 998

(51) Int. Cl.[7] .............................................. F02B 75/06
(52) U.S. Cl. ...................................... 123/192.1; 74/604
(58) Field of Search ........................... 123/192.1, 192.2; 74/574, 604

(56) References Cited

U.S. PATENT DOCUMENTS

| 6,142,115 A | 11/2000 | Haas et al. | 123/192.1 |
| 6,308,678 B1 | 10/2001 | Haas et al. | 123/192.1 |
| 6,382,164 B1 | 5/2002 | Haas et al. | 123/192.1 |

*Primary Examiner*—Noah P. Kamen
(74) *Attorney, Agent, or Firm*—Simpson & Simpson, PLLC

(57) ABSTRACT

A torsional vibration damping apparatus, especially a web damper for mounting on a crankshaft of a piston engine, particularly an internal combustion engine for suppression of natural torsion frequencies from crankshafts can now be economically produced. The apparatus comprises a housing fastened to the engine crankshaft to which at least one rotary mass is coupled with spring elements disposed between the housing and the rotary mass allowing the apparatus to be pre-assembled. Advantageously, multiple parts of the torsional vibration damping apparatus, such as the housing can now be fabricated from more economic sheet metal in place of more costly cast parts.

18 Claims, 8 Drawing Sheets

180; # TORSIONAL VIBRATION DAMPING APPARATUS

BACKGROUND OF THE INVENTION

This invention relates generally to a torsional vibration damping apparatus, especially a web damper, for mounting on a crankshaft of a piston engine, especially an internal combustion engine. The invention also relates to a crankshaft and a piston engine having a torsional vibration damping apparatus.

Traditional torsional vibration damping apparatuses for crankshafts, especially web dampers, often comprise multiple cast parts, which must be expensively finish-machined.

OBJECTS OF THE INVENTION

The object of the present invention is therefore to provide a torsional vibration damping apparatus, especially a web damper of the type described at the outset, that can be inexpensively produced.

This objective is achieved for a torsional vibration damping apparatus, especially a web damper for mounting on a crankshaft of a piston engine, especially an internal combustion engine, in that the torsional vibration damping apparatus comprises multiple sheet metal parts. The sheet metal parts provide the advantage that they are easily and economically produced. The sheet metal parts can be produced, for example, from drawn sheet metal. Individual areas of the sheet metal parts, such as boreholes or openings can be punched out. It is also possible to machine individual areas of the sheet metal parts using metal cutting tools.

BRIEF SUMMARY OF THE INVENTION

A preferred exemplary embodiment of the torsional vibration damping apparatus is characterized in that the torsional vibration damping apparatus comprises a housing that is fastened to the crankshaft and to which at least one rotary mass is coupled, spring elements being disposed between said housing and said mass. This supplies the advantage that the torsional vibration damping apparatus can be pre-assembled. The pre-assembled torsional vibration damping apparatus can then be fastened to the crankshaft of a piston engine in one assembly step.

Another preferred exemplary embodiment of the torsional vibration damping apparatus is characterized in that the housing comprises an essentially pan-shaped sheet metal part with a base that has an essentially rectangular opening that is open on one side. The opening is used to join the torsional vibration damping apparatus in an interlocking manner to an area of the crankshaft of the piston engine that has a complementary configuration.

Another preferred exemplary embodiment of the torsional vibration damping apparatus is characterized in that an essentially circular-segment-shaped shoulder is formed on the housing in the area of the cutout. The circular-segment-shaped shoulder is used to fasten the torsional vibration damping apparatus to the crankshaft of a piston engine.

Another preferred exemplary embodiment of the torsional vibration damping apparatus is characterized in that at least one through hole is provided in the circular-segment-shaped shoulder. The through hole is used to receive fastening means, such as screws, with which the torsional vibration damping apparatus can be fastened to the crankshaft of a piston engine.

Another preferred exemplary embodiment of the torsional vibration damping apparatus is characterized in that the base of the housing has a round rim that is bent 90°. The bent or turned rim outwardly delimits the housing in the radial direction.

Another preferred exemplary embodiment of the torsional vibration damping apparatus is characterized in that the housing on the side that faces away from the base can be enclosed by a cover that is formed from a sheet metal part. The outer contour of the cover is preferably adapted to the inner contour of the bent rim of the housing base.

Another preferred exemplary embodiment of the torsional vibration damping apparatus is characterized in that the housing base and the housing cover are attached to each other using spacer bolts. The spacer bolts ensure a spaced arrangement of the two housing parts. The housing cover can, however, also be attached to the housing base using a welded joint at, for example, the bent rim of the base.

Another preferred exemplary embodiment of the torsional vibration damping apparatus is characterized in that arranged within the housing is at least one flywheel mass that is formed by at least one sheet metal part. The sheet metal part can be economically produced, for example, by punching.

Another preferred exemplary embodiment of the torsional vibration damping apparatus is characterized in that at least one sliding element is mounted on the flywheel mass on the radially outward side. The sliding element is used to minimize the friction between the flywheel mass and the housing, especially inside at the bent rim of the housing base. For this purpose, the sliding element is preferably made out of plastic.

Another preferred exemplary embodiment of the torsional vibration damping apparatus is characterized in that at least one oblong opening is made in each of the housing base, the flywheel mass and the housing cover, the openings in the housing base, the flywheel mass and the housing cover being tangentially arranged in such a manner that they are in alignment when the torsional vibration damping apparatus is in the assembled state. The openings are used to hold compression springs, by which the flywheel mass is coupled to the housing.

Another preferred exemplary embodiment of the torsional vibration damping apparatus is characterized in that through holes are provided on the housing base to hold weighting rivets. The weighting rivets are fastened as needed in different sizes and numbers on the housing bases.

Another preferred exemplary embodiment of the torsional vibration damping apparatus is characterized in that the torsional vibration damping apparatus is essentially configured in the shape of a horseshoe. This supplies the advantage that the torsional vibration damping apparatus can be integrated in a space-neutral manner in the crank web of a crankshaft. This means that both the housing base and the housing cover are configured in the shape of a horseshoe.

On a crankshaft for a piston engine, especially for an internal combustion engine, having several webs, the objective indicated above is achieved by a previously described torsional vibration damping apparatus being integrated into at least one web of the crankshaft.

BRIEF DESCRIPTION OF THE DRAWINGS

Additional advantages, features and details of the invention emerge in the following description in which.

DETAILED DESCRIPTION OF THE PREFERRED EMBODIMENT

Torsional vibration damping apparatuses, which can also be called vibration dampers, are used among other things to suppress natural torsion frequencies from crankshafts. In many cases, such a natural frequency is present in the range of approximately 300 to 450 Hz. It is stimulated in particular by the irregularity that results from the compression and expansion occurring in the pistons. A vibration in the torsional resonance can lead to breakage of the crankshaft, which is why torsional vibration dampers or torsional vibration cushions are used. The torsional vibration damping apparatus is also called a rotary vibration damping apparatus.

A torsional vibration damping apparatus having a spring coupling is comprised in principle of a rotary mass having a defined moment of inertia that is joined to the crankshaft via spring elements. The natural frequency of the damper, which must be harmonized with the natural frequency of the crankshaft, is produced by the torsion resistance of the spring elements and the moment of inertia of the rotary mass. The vibration properties of the crankshaft are altered by the torsional vibration damping apparatus. The system gains an additional degree of freedom; at damping to zero, the original point of resonance disappears completely, and therefore two new resonance levels occur. At a very high level of damping, no effect is produced, the damper is almost rigidly coupled, and approximately the base resonance of the crankshaft appears. When the damping is correctly designed, neither the new resonance levels nor the original ones emerge disruptively.

Figure 1:
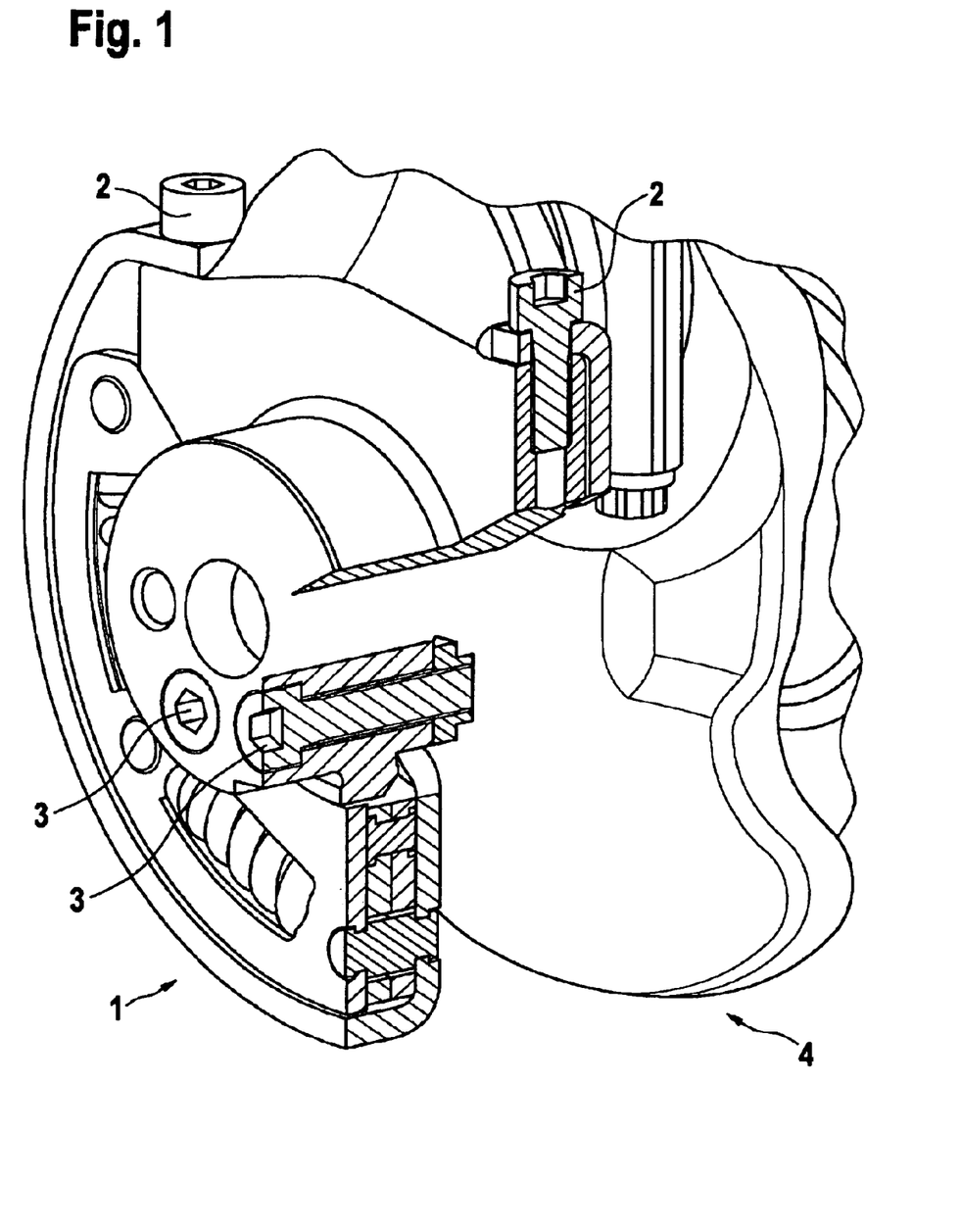
FIG. 1 is a perspective, partial cross-sectional view of a torsional vibration damper mounted on a crankshaft.
Figure 2:
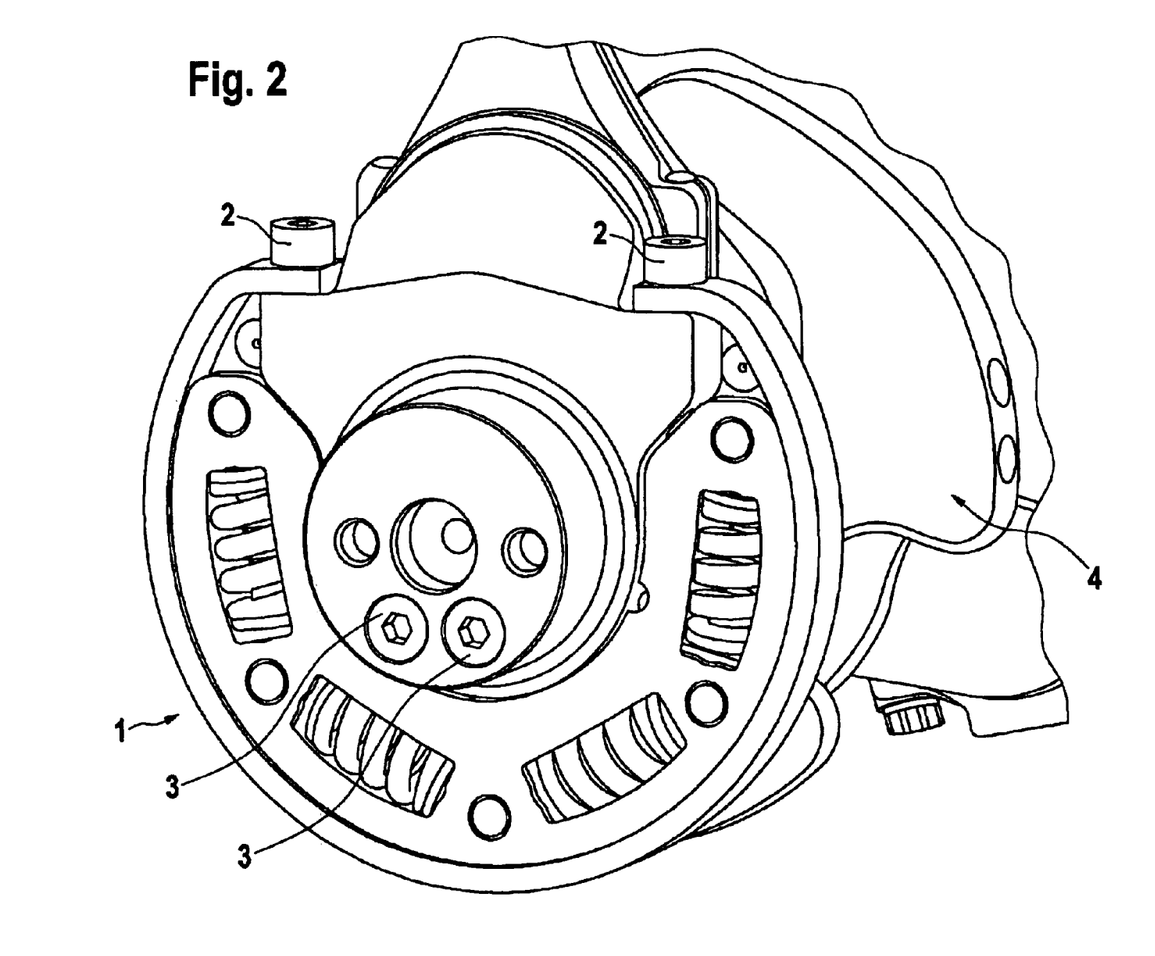
FIG. 2 is another perspective illustration of the mounted torsional vibration damper from FIG. 1.

In FIGS. 1 and 2, a vibration damper 1, is shown that is fastened with screws 2 and 3 to crankshaft 4. Vibration damper 1, located on the first crank web, is fastened to the crankshaft using two radial screws 2 and two axial screws 3 and then is installed together with it in the engine block. Vibration damper 1 simultaneously replaces one of the counterweights of crankshaft 4.

Figure 3:
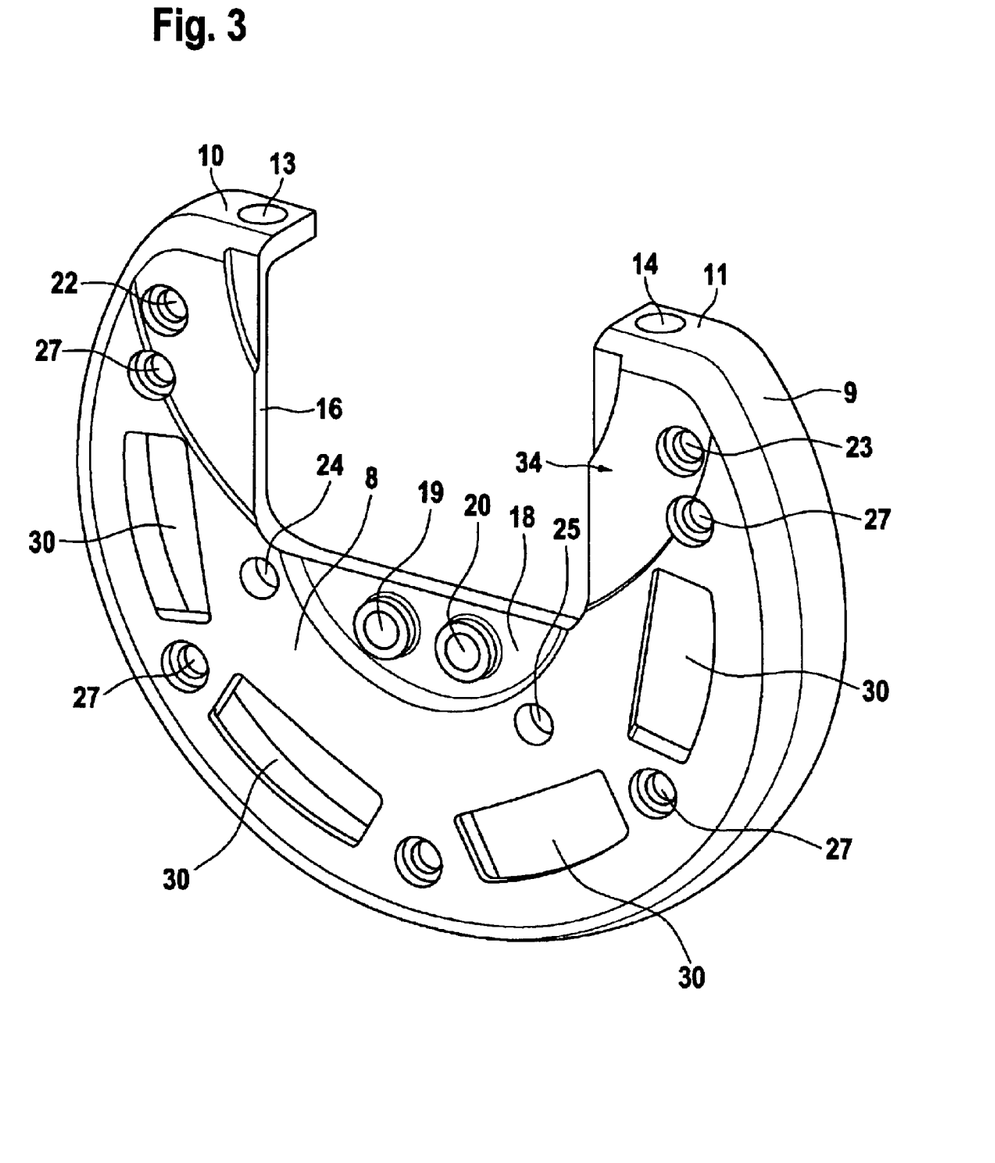
FIG. 3 is a perspective illustration of the housing base of the torsional vibration damping apparatus in isolation.
Figure 4:
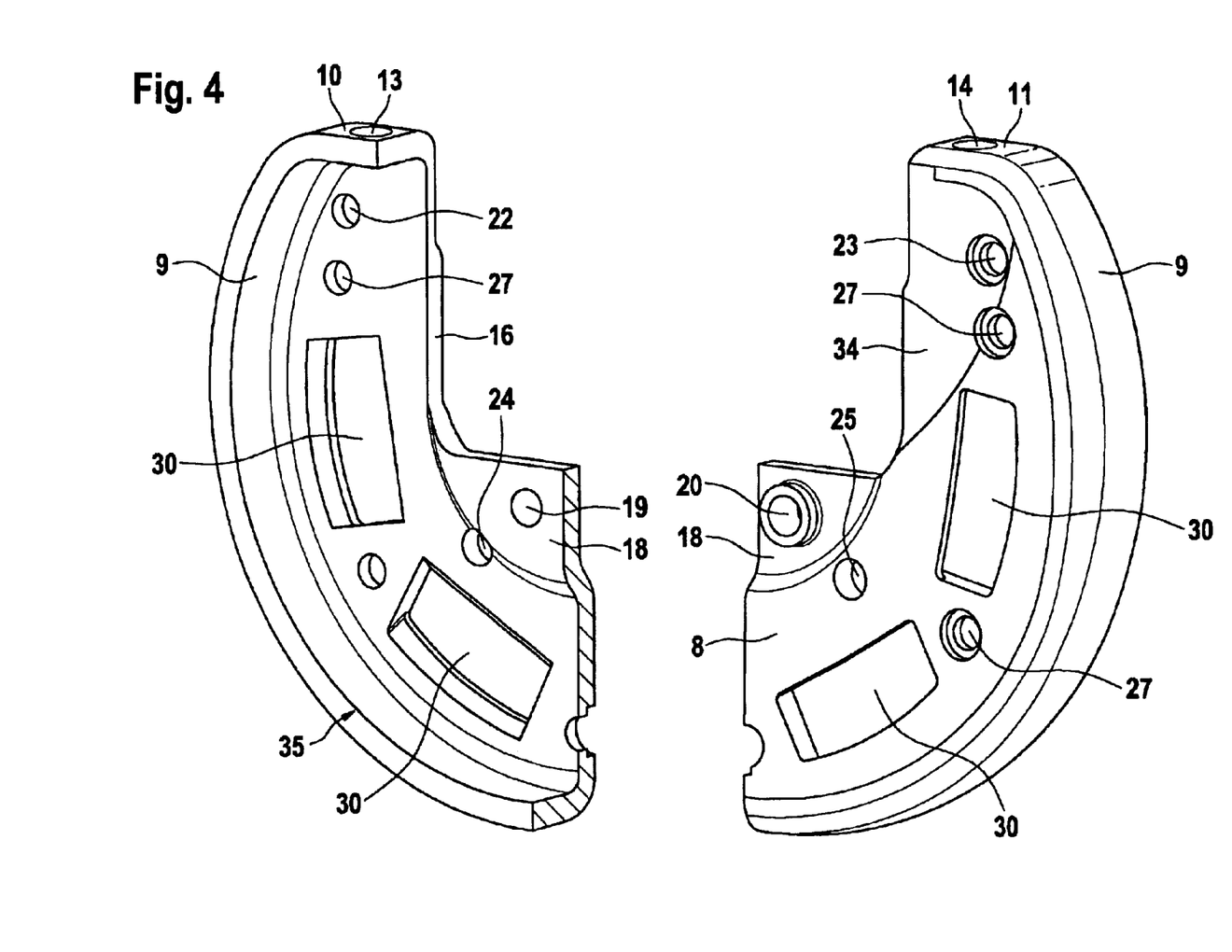
FIG. 4 is another perspective view of the housing base from FIG. 3 in separated form.

Shown in isolation in FIGS. 3 and 4 is a housing base 8 of the torsional vibration damping apparatus 1 that is described in FIGS. 1 and 2. Housing base 8 has essentially the form of a circular disk whose rim 9 is bent into an angle of approximately 90°. Two flat faces 10 and 11, in which through holes 13 and 14 are placed, are formed on bent rim 9 of housing base 8. Through holes 13 and 14 are used to pass through screws 2, which are illustrated in FIGS. 1 and 2 and used to fasten torsional vibration damping apparatus 1 to crankshaft 4.

Between two flat faces 10 and 11, an essentially rectangular opening 16 is arranged in housing base 8. Opening 16 is open on one side and forms an interlocking area, which facilitates an interlocking joint between housing base 8 and the crankshaft (not shown in FIGS. 3 and 4).

In the central area of housing base 8, rectangular opening 16 is delimited by a circular-segment-shaped shoulder 18 in which two through holes 19 and 20 are provided. Through holes 19 and 20 are used to pass through screws 3, which are depicted in FIGS. 1 and 2 and used in turn to fasten the torsional vibration damping apparatus to the crankshaft.

Moreover, through holes 22 and 23 for holding weighting rivets are provided in housing base 8 radially toward the outside close to bent rim 9. Arranged radially further inward are mounting holes 24 and 25. Mounting holes 24 and 25 are used, for example, to hold mounting tools or aids.

Radially toward the outside, also close to bent rim 9, five through holes 27 that are used to hold or fasten spacer bolts (not shown) are provided in housing base 8. Arranged between every two through holes 27 is an oblong window 30, which is used to hold spring elements (not shown).

Housing base 8, which is depicted in FIGS. 3 and 4, is formed out of drawn sheet metal. Through holes 13, 14, 19, 20, 22, 23, 24, 25 and 27, as well as window 30 and opening 16, were punched out of drawn sheet metal. Areas 34 and 35 of housing base 8 are machined out with metal cutting tools.

Figure 5:
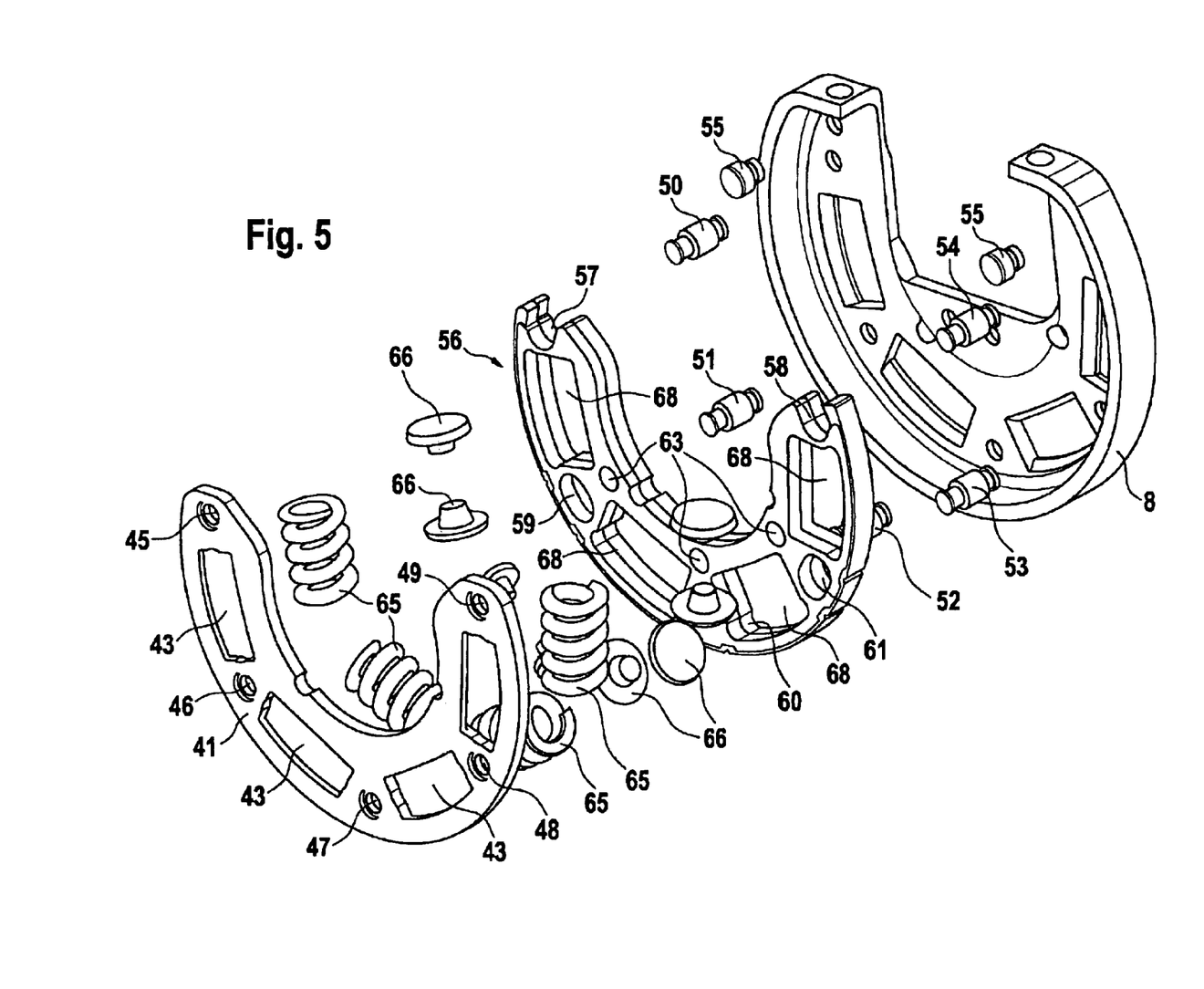
FIG. 5 is an exploded view of the torsional vibration damping apparatus shown in FIGS. 1 and 2.

In FIG. 5 one sees that housing base 8, which can also be called a housing pan, can be enclosed by a housing cover 41 that is essentially configured in the shape of a horseshoe. Four windows 43 are provided in housing cover 41 that are configured to be congruent to windows 30 in housing base 8. Windows 43 are each arranged between two through holes 45–46; 46–47; 47–48 and 48–49. Through holes 45 to 49 are used, just like through holes 27 in housing base 8, to hold or fasten spacer bolts 50 to 54. Spacer bolts 50 to 54 are used to hold housing cover 41 at a defined distance from housing base 8.

Weighting rivets 55, which can be mounted in housing base 8 as needed in through holes 22 and 23, are also depicted in FIG. 5.

Spacer bolts 50 to 54 create a housing space between housing base 8 and housing cover 41 radially within bent rim 9 of housing base 8 for a flywheel mass 56, which is also configured in the shape of a horseshoe. Flywheel mass 56, like housing cover 41, is a punched out sheet metal part. Provided at the open end of flywheel mass 56 are indentations 57 and 58 for spacer bolts 50 and 54. Indentations 57 and 58 are sized so that in the assembled state it is possible to turn the torsional vibration damping apparatus within the housing, which is formed from housing base 8 and housing cover 41, and specifically in spite of the presence of spacer bolts 50 and 54. Moreover, oblong holes 59, 60 and 61, through which spacer bolts 51, 52 and 53 project in the assembled state of the torsional vibration damping apparatus, are provided in flywheel mass 56. Oblong holes 59 to 61 are sized so that, in spite of the presence of spacer bolts 51 to 53, it is possible to turn flywheel mass 56 within the housing. Flywheel mass 56 can be formed in one part or in several parts. In the present case, flywheel mass 56 comprises multiple parts that are held together by rivets 63.

Windows 30, 43 and 68 in housing base 8, housing cover 41 and flywheel mass 56 are used to hold compression springs 65, which are routed through cups 66. Compression springs 65 are pre-tensioned in the installed state and couple flywheel mass 56 to the housing. Windows 68, which are provided in flywheel mass 56, have the same length but a greater width than windows 43 in housing cover 41 and windows 30 in housing base 8. The lesser width of windows 43 and 30 prevents compression springs 65 from falling out of the housing through windows 30 and 43. For this purpose, the width of windows 43 and 30 is smaller than the diameter of compression springs 65. The width of window 68 in flywheel mass 56 is somewhat larger than the diameter of compression springs 65.

Figure 6:
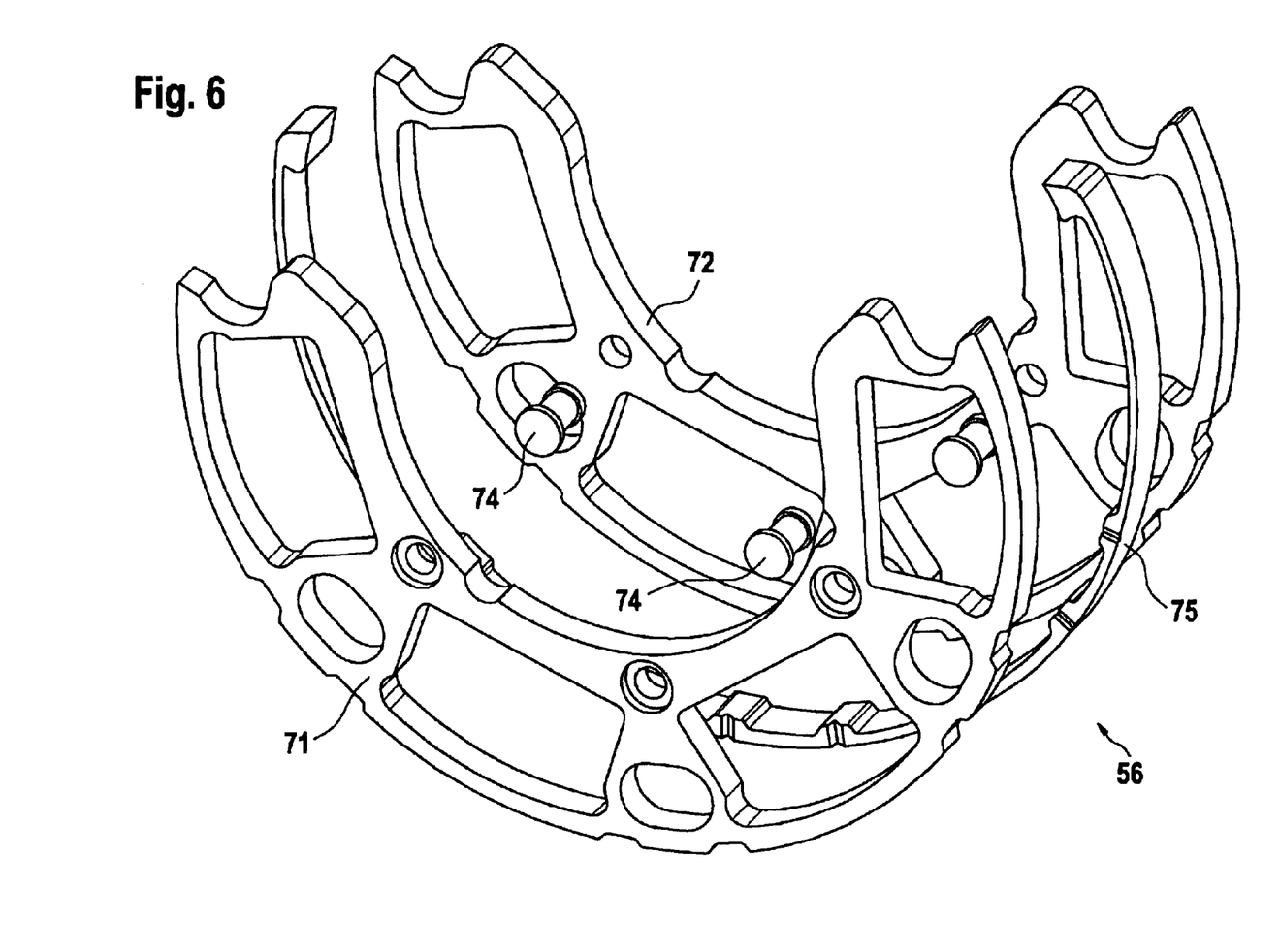
FIG. 6 is an exploded view of the flywheel mass of the torsional vibration damping apparatus illustrated in FIG. 5.
Figure 7:
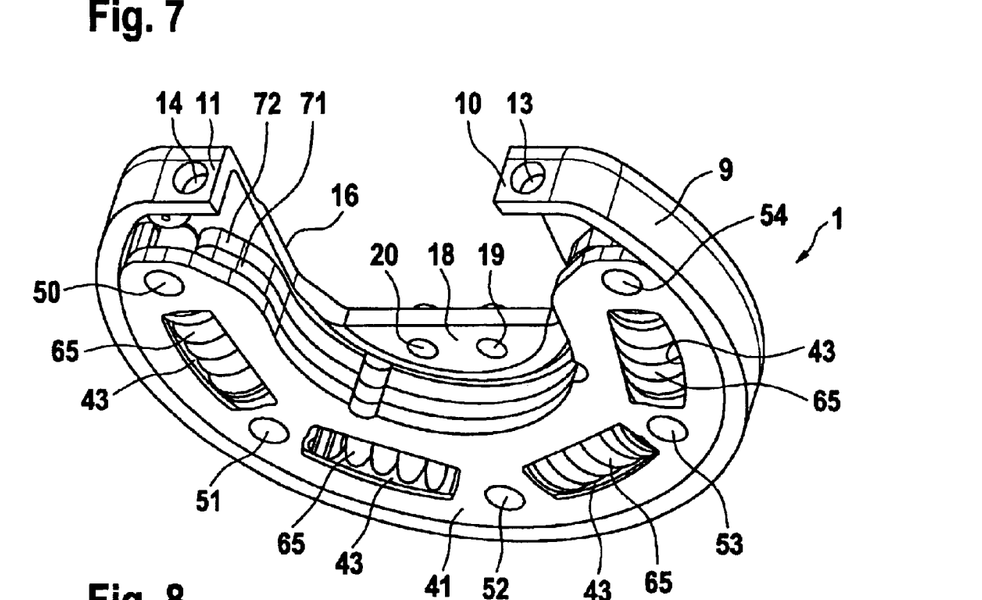
FIG. 7 is a perspective illustration as a line drawing of the torsional vibration damping apparatus.
Figure 8:
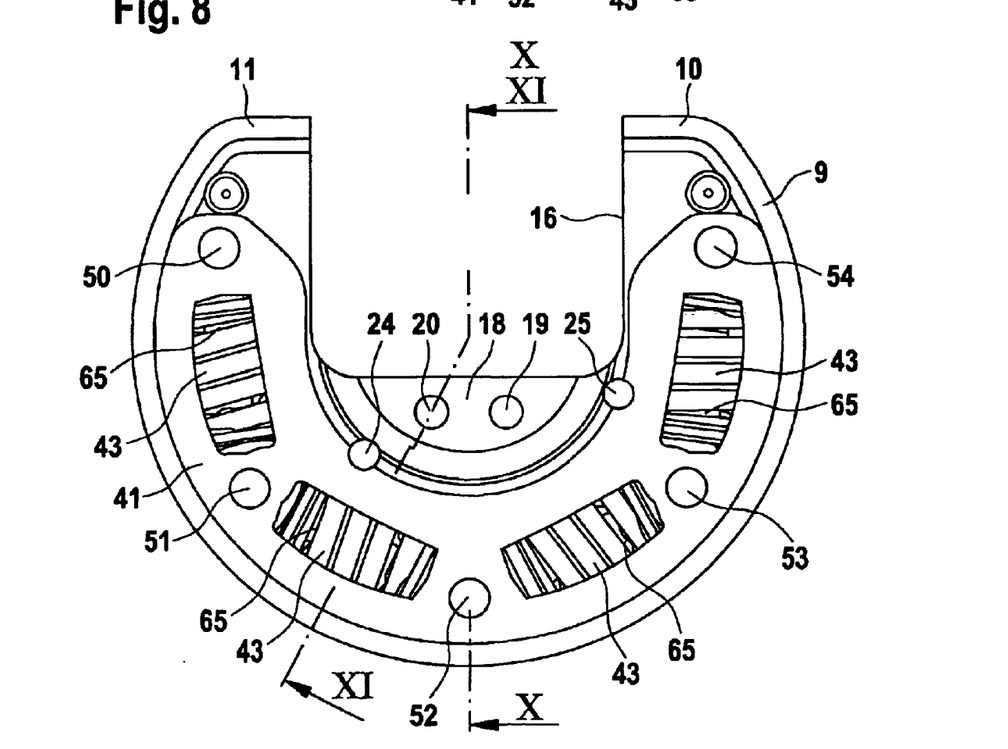
FIG. 8 illustrates the torsional vibration damper from FIG. 7 in horizontal projection.
Figure 9:
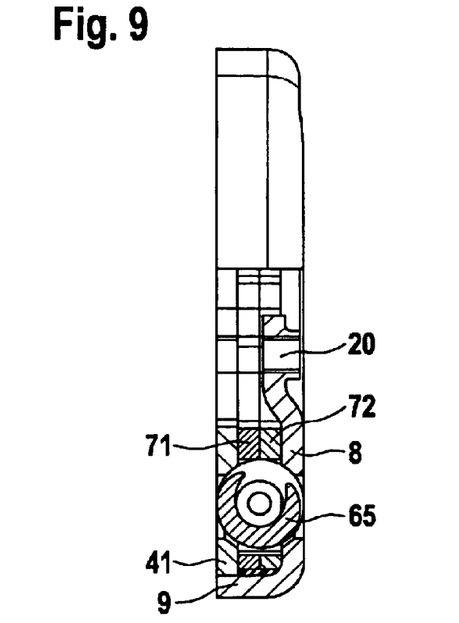
FIG. 9 is a view taken generally along line IX—IX in FIG. 8.
Figure 10:
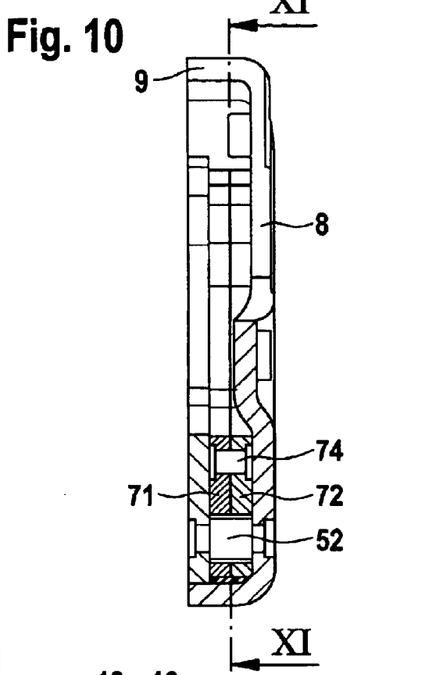
FIG. 10 is a view taken generally along line X—X in FIG. 8.
Figure 11:
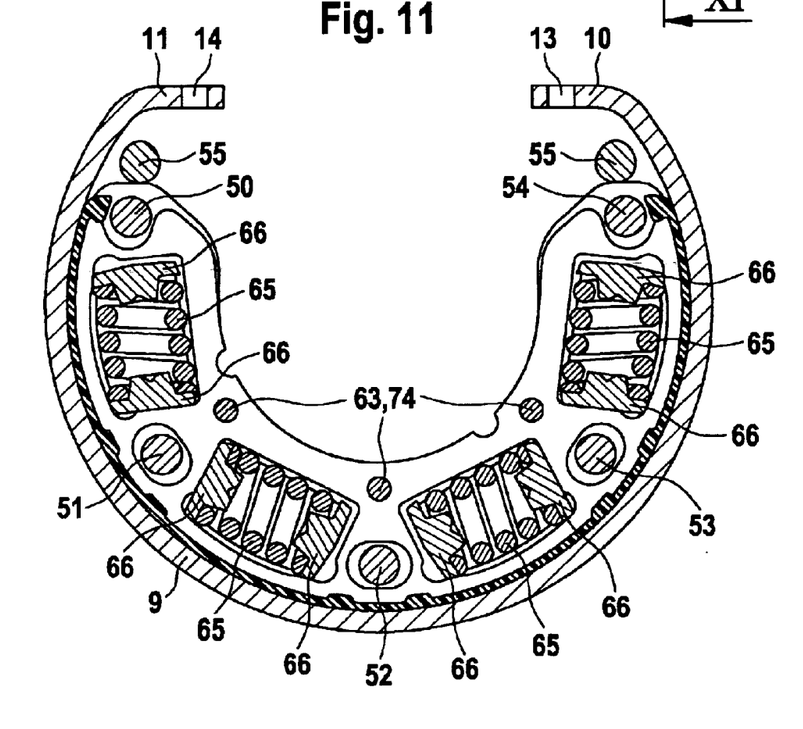
FIG. 11 is a view taken generally along line XI—XI in FIG. 10.

In FIG. 6 one sees that flywheel mass 56 from FIG. 5 is formed from a first sheet metal part 71 and a second sheet metal part 72. The two sheet metal parts 71 and 72 are held together by rivets 74, which correspond to rivets 63 in FIG. 5. Radially to the outside, a sliding element 75 made of plastic, which essentially has the shape of a circular ring section, is fastened between or on the two sheet metal parts 71 and 72. Sliding element 75 in the installed state comes to rest against the inside of the bent rim 9 of housing base 8.

In FIGS. 7 to 11, the torsional vibration damping apparatus in the assembled state is illustrated in different views. The frictional damping is produced by a combination of compression spring pre-tensioning and the centrifugal force on the flywheel mass or damper mass. To produce a pre-tensioning force and additional friction, an additional, axial spring element may be provided.

Thus it is seen that the objects of the invention are efficiently obtained, although modifications to the invention should be readily apparent to those having ordinary skill in the art, and these changes and modifications are intended to be within the scope of the claims.

What is claimed is:

1. A torsional vibration damping apparatus arranged to be mounted on a crankshaft of a piston engine comprising a housing having at least a housing base and a housing cover, said damping apparatus further comprising at least one metal flywheel mass arranged for mounting between said housing base and said housing cover, and a plurality of compression spring held in place by said housing base and said housing cover, said compression springs arranged to couple said flywheel mass to said housing, wherein at least said housing base and said housing cover are formed from sheet metal.

2. The torsional vibration damping apparatus as described in claim 1, wherein said at least one flywheel mass is formed from sheet metal.

3. The torsional vibration damping apparatus as described in claim 1, wherein said compression springs are pretensioned.

4. The torsional vibration damping apparatus as described in claim 1, wherein the housing is fastened to said crankshaft.

5. The torsional vibration damping apparatus as described in claim 1, wherein said housing comprises an essentially pan-shaped, pre-formed sheet metal part as said housing base with an essentially rectangular cut-out that is open on one-side.

6. The torsional vibration damping apparatus as described in claim 5, wherein a shoulder essentially in the shape of a circular segment is formed on said housing base in the area of said cut-out.

7. The torsional vibration damping apparatus as described in claim 6, wherein at least one through hole is provided in said circular segment-shaped shoulder.

8. The torsional vibration damping apparatus as described in claim 5, wherein the essentially pan-shaped housing is enclosed by a cover which is formed by a sheet metal part.

9. The torsional vibration damping apparatus as described in claim 1, wherein said housing base of the housing comprises a rim bent at about 90°.

10. The torsional vibration damping apparatus as described in claim 1, wherein at least one sliding element is mounted on the flywheel mass radially to the outside.

11. The torsional vibration damping apparatus as described in claim 1, wherein at least one oblong opening is made in each of the housing base, the flywheel mass and the housing cover, the openings in the housing base, the flywheel mass and the housing cover being tangentially arranged in such a manner that they are in alignment when the torsional vibration damping apparatus is in the assembled state.

12. The torsional vibration damping apparatus as described in claim 1, wherein through holes are provided in the housing base for holding weighting rivets.

13. The torsional vibration damping apparatus as described in claim 1, wherein the torsional vibration damping apparatus is configured essentially in the shape of a horseshoe.

14. A crankshaft for a piston engine having multiple webs, wherein a torsional vibration damping apparatus as described in claim 1 is integrated in at least one web of said crankshaft.

15. A piston engine having a crankshaft as described in claim 14.

16. A piston engine as described in claim 15, which is an internal combustion engine.

17. The crankshaft as described in claim 14, wherein said piston engine is an internal combustion engine.

18. The torsional vibration damping apparatus as described in claim 1, wherein said housing base and said housing cover are fastened to each other by spacer bolts.

* * * * *